United States Patent
Jun

(10) Patent No.: US 11,969,136 B2
(45) Date of Patent: Apr. 30, 2024

(54) VACUUM CLEANER AND CONTROL METHOD THEREFOR

(71) Applicant: LG ELECTRONICS INC., Seoul (KR)

(72) Inventor: Woochan Jun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 808 days.

(21) Appl. No.: 17/049,670

(22) PCT Filed: Apr. 18, 2019

(86) PCT No.: PCT/KR2019/004694
§ 371 (c)(1),
(2) Date: Oct. 22, 2020

(87) PCT Pub. No.: WO2019/212172
PCT Pub. Date: Nov. 7, 2019

(65) Prior Publication Data
US 2021/0244246 A1    Aug. 12, 2021

(30) Foreign Application Priority Data

Apr. 30, 2018  (KR) .................. 10-2018-0050107

(51) Int. Cl.
*A47L 9/00* (2006.01)
*A47L 9/28* (2006.01)
*G05D 1/00* (2006.01)

(52) U.S. Cl.
CPC ............. *A47L 9/009* (2013.01); *A47L 9/2821* (2013.01); *A47L 9/2826* (2013.01);
(Continued)

(58) Field of Classification Search
None
See application file for complete search history.

(56) References Cited

U.S. PATENT DOCUMENTS 8,855,914 B1    10/2014  Alexander et al.
9,630,319 B2 *   4/2017  Vicenti ................ G05D 1/0272
(Continued)

FOREIGN PATENT DOCUMENTS

EP    3184012    6/2017
JP    2744633    4/1998
(Continued)

OTHER PUBLICATIONS

European Search Report dated Jan. 5, 2022 issued in Application No. 19795886.1.
(Continued)

*Primary Examiner* — Truc M Do
(74) *Attorney, Agent, or Firm* — KED & ASSOCIATES, LLP

(57) ABSTRACT

A vacuum cleaner for performing autonomous driving may include: a main body; a driving unit; a suctioning unit; a plurality of sensors for sensing obstacles present in each direction; and a control unit for controlling the driving unit to move the main body on the basis of a preset driving pattern. The control unit uses sensors provided at the front side of the main body and a first side of the both sides of the main body so as to detect whether entry into a corner area among cleaning areas is made while driving along the preset driving pattern, and controls the driving unit such that the first side of the main body comes into contact with a first wall forming the corner area at least one time when the main body enters the corner area.

10 Claims, 7 Drawing Sheets

(52) U.S. Cl.
CPC .......... *A47L 9/2852* (2013.01); *G05D 1/0219* (2013.01); *G05D 1/0227* (2013.01); *A47L 2201/04* (2013.01); *G05D 2201/0215* (2013.01)

(56) References Cited

U.S. PATENT DOCUMENTS

| | | | |
|---|---|---|---|
| 2012/0065829 | A1 | 3/2012 | Yu et al. |
| 2015/0166060 | A1* | 6/2015 | Smith .................. G01S 15/876 701/23 |
| 2017/0273527 | A1* | 9/2017 | Han ..................... G01C 21/005 |
| 2017/0332857 | A1 | 11/2017 | Nam et al. |

FOREIGN PATENT DOCUMENTS

| | | |
|---|---|---|
| JP | 2013-247986 | 12/2013 |
| JP | 2014-028034 | 2/2014 |
| JP | 5891736 | 3/2016 |
| JP | 2016-201096 | 12/2016 |
| JP | 2017-503267 | 1/2017 |
| JP | 2017-153787 | 9/2017 |
| JP | 6195649 | 9/2017 |
| KR | 10-2010-0052702 | 5/2010 |
| KR | 10-2011-0053760 | 5/2011 |
| KR | 10-2016-0091087 | 8/2016 |
| WO | WO 2016/003077 | 1/2016 |

OTHER PUBLICATIONS

International Search Report dated Aug. 16, 2019 issued in Application No. PCT/KR2019/004694.
Korean Notice of Allowance dated Mar. 16, 2020 issued in Application No. 10-2018-0050107.

* cited by examiner

VACUUM CLEANER AND CONTROL METHOD THEREFOR

CROSS-REFERENCE TO RELATED PATENT APPLICATIONS

This application is a U.S. National Stage Application under 35 U.S.C. § 371 of PCT Application No. PCT/KR2019/004694, filed Apr. 18, 2019, which claims priority to Korean Patent Application No. 10-2018-0050107, filed Apr. 30, 2018, whose entire disclosures are hereby incorporated by reference.

BACKGROUND

1. Technical Field

The present disclosure relates to a vacuum cleaner and a control method thereof, and more particularly, to a vacuum cleaner capable of recognizing an obstacle and performing autonomous driving, and a control method thereof.

2. Description of the Related Art

In general, robots have been developed for industrial use and have been part of factory automation. In recent years, the field of application of robots has been expanded, and medical robots, aerospace robots, and the like have been developed, and household robots that can be used in ordinary homes have also been made.

A representative example of the household robot is a robot vacuum cleaner, which is a type of household appliance that sucks and cleans dust or foreign matter around the robot while running in a certain area by itself. Such a robot vacuum cleaner is generally provided with a rechargeable battery, and provided with an obstacle sensor that can avoid an obstacle while driving so that it can move and clean by itself.

In recent years, research has been actively carried out to use the robot vacuum cleaner in various fields such as health care, smart home, remote control, and the like, apart from merely autonomously driving in a cleaning area to perform a cleaning operation.

On the other hand, when a suction unit of the robot vacuum cleaner is provided in front of the main body, there is a problem in that cleaning is not sufficiently performed on a corner area during wall following driving along a wall of the cleaning area.

In other words, depending on the number of suction units or installation positions, a separate driving pattern is required to minimize an uncleaned area.

In this regard, Korean Patent Patent Publication No. 10-2011-0053760 (published on May 24, 2011) discloses a robot vacuum cleaner that performs zigzag driving.

However, since the above prior literature above does not disclose a configuration for solving the problem that the corner area is not sufficiently cleaned when performing zigzag driving, there still remains a problem that the user is unsatisfied with the performance of the robot vacuum cleaner.

SUMMARY

A technical problem to be solved by the present disclosure is to provide a vacuum cleaner that performs autonomous driving capable of improving a cleaning success rate of a corner area in a cleaning area, and a control method thereof.

Furthermore, an aspect of the present disclosure is to provide a vacuum cleaner that performs autonomous driving performing a unique driving pattern to allow the vacuum cleaner having a suction unit only on a front side of the main body performs sufficient cleaning for a corner area, and a control method thereof.

In order to achieve the foregoing technical tasks of the present disclosure, a vacuum cleaner performing autonomous driving according to the present disclosure may include a main body, a driving unit that moves the main body in a cleaning area, a suction unit provided on a front surface of the main body, a plurality of sensors provided on the front surface of the main body and on both side surfaces of the main body, respectively, to sense an obstacle present in each direction, and a control unit that controls the driving unit to move the main body based on a preset driving pattern.

In particular, the control unit according to an embodiment of the present disclosure may detect whether to enter a corner area of the cleaning area using a sensor provided on the front surface of the main body and a sensor provided on a first side surface between the both side surfaces of the main body while driving according to the preset driving pattern.

In addition, the control unit may control the driving unit to allow the first side surface of the main body to come into contact with a first wall defining the corner area at least once or more when the main body enters the corner area.

According to an embodiment, when the first side surface comes into contact with the first wall, the control unit may control the driving unit to sequentially perform first corner driving to separate the first side surface from the first wall, and second corner driving to allow the first side surface to come into contact with the first wall again.

According to an embodiment, a sensor provided on the first side surface may be composed of an impact sensor that senses a physical force applied from the outside, and the control unit may determine whether to perform the first corner driving or the second corner driving based on the output of the sensor provided on the first side surface.

According to an embodiment, when the output of the sensor provided on the first side surface increases from a value below a preset first reference to a value above a preset second reference, the control unit may control the driving unit to perform the first corner driving.

According to an embodiment, when the output of the sensor provided on the first side surface decreases from a value above the second reference to a value below the first reference, the control unit may control the driving unit to perform the second corner driving.

According to an embodiment, the control unit may control the driving unit to repeatedly perform the first and second corner driving until the suction unit provided on the front surface of the main body comes into contact with a second wall defining the corner area together with the first wall.

According to an embodiment, the sensor provided on the front surface of the main body may be composed of an impact sensor that senses a physical force applied from the outside, and the control unit may determine whether the suction unit comes into contact with the second wall using the output of the sensor provided on the front surface of the main body.

According to an embodiment, the control unit may select a wall facing the front surface of the body as the first wall when entering the corner area between two walls defining the corner area.

According to an embodiment, when the front surface of the main body comes into contact with the first wall, the control unit may perform posture change driving that changes the posture of the main body to allow the front surface of the main body to face a second wall defining the corner area together with the first wall.

According to an embodiment, when the posture change driving is completed, the control unit may control the driving unit to repeatedly perform the first and second corner driving.

According to an embodiment, the posture change driving may include a first posture change process of moving the main body backward along a first curved path to allow the front surface of the main body to face the second wall when the front surface of the main body comes into contact with the first wall, a second posture change process of moving the main body straight to allow the front surface of the main body to come into contact with the second wall, and a third posture change process to allow the main body to drive along a second curved path so that the side surface of the main body comes into contact with the first wall.

According to an embodiment, the driving unit may include two main wheels corresponding to both side surfaces of the main body, respectively, and the control unit may control the driving unit to rotate either one of the two main wheels, which is closer to the first wall, more rapidly than the other one so as to perform the first corner driving.

According to an embodiment, the control unit may control the driving unit to rotate either one of the two main wheels, which is closer to the first wall, more slowly than the other one so as to perform the second corner driving.

According to an embodiment, the sensor provided on the side surface of the main body may be configured to sense a distance to an obstacle, and when the front surface of the main body comes into contact with the first wall, the control unit may compute a distance from the side surface of the main body to the second wall, and determine whether the main body has entered the corner area based on the computed distance.

According to the present disclosure, a robot vacuum cleaner may perform precise driving in a corner area to clean the cleaning area thoroughly, thereby improving the performance of the vacuum cleaner.

In particular, according to the present disclosure, an uncleaned area in which cleaning cannot be performed by zigzag driving may be minimized, thereby improving user's satisfaction with the vacuum cleaner.

DETAILED DESCRIPTION OF THE EMBODIMENTS

Hereinafter, an embodiment disclosed herein will be described in detail with reference to the accompanying drawings, and it should be noted that technological terms used herein are merely used to describe a specific embodiment, but not limitative to the concept of the present disclosure.

Figure 1:
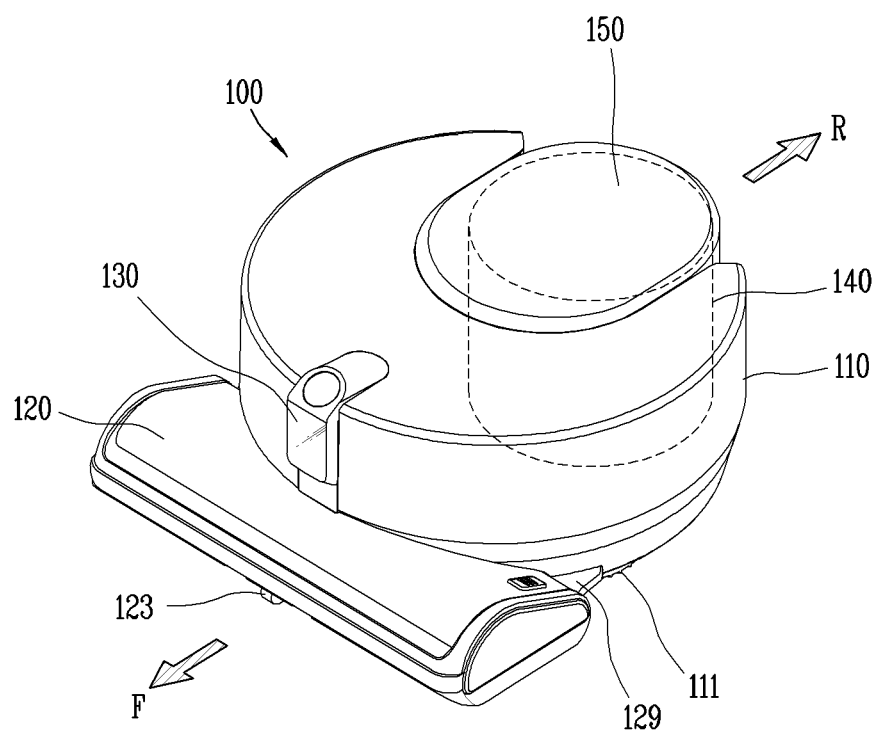
FIG. 1 is a perspective view illustrating an example of a vacuum cleaner that performs autonomous driving according to the present disclosure.
Figure 2:
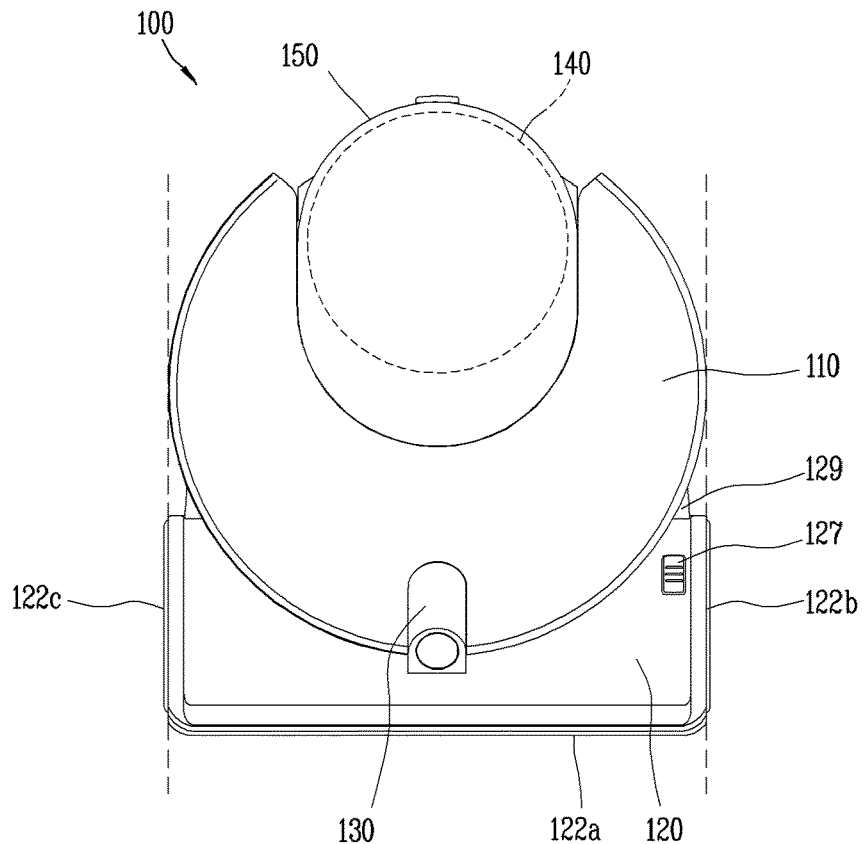
FIG. 2 is a plan view illustrating the vacuum cleaner that performs autonomous driving illustrated in FIG. 1.
Figure 3:
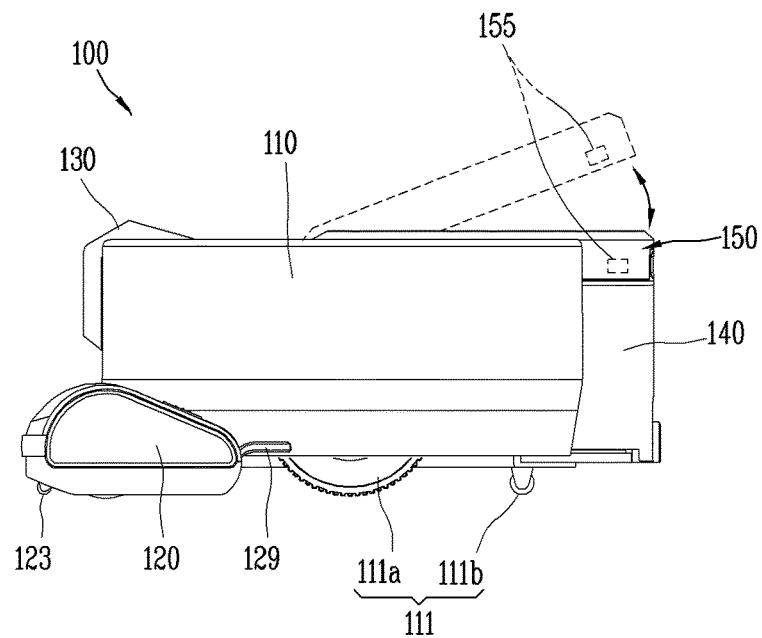
FIG. 3 is a side view illustrating the vacuum cleaner that performs autonomous driving illustrated in FIG. 1.

FIG. 1 is a perspective view illustrating an example of a robot vacuum cleaner 100 according to the present disclosure, FIG. 2 is a plan view of the robot vacuum cleaner 100 illustrated in FIG. 1, and FIG. 3 is a side view of the robot vacuum cleaner 100 illustrated in FIG. 1.

For reference, in this specification, a mobile robot, a robot vacuum cleaner, and a vacuum cleaner that performs autonomous driving may be used in the same sense.

Referring to FIGS. 1 through 3, the robot vacuum cleaner 100 performs a function of cleaning a floor while driving on a predetermined area by itself. Cleaning of a floor mentioned here includes sucking dust (including foreign matter) on the floor or mopping the floor.

The robot vacuum cleaner 100 includes a vacuum cleaner body 110, a suction unit 120, a sensing unit 130, and a dust box 140.

The vacuum cleaner body 110 is provided with a control unit (not shown) for the control of the robot vacuum cleaner 100 and a wheel unit 111 for the driving of the robot vacuum cleaner 100. The robot vacuum cleaner 100 may move forward, backward, leftward and rightward by the wheel unit 111.

The wheel unit 111 includes main wheels 111*a* and a sub wheel 111*b*.

The main wheels 111*a* are provided on both sides of the vacuum cleaner body 110 and configured to be rotatable in one direction or another direction according to a control signal of the control unit. Each of the main wheels 111*a* may be configured to be driven independently of each other. For example, each main wheel 111*a* may be driven by a different motor.

The sub wheel 111*b* is configured to support the vacuum cleaner body 110 along with the main wheel 111*a* and assist the driving of the robot vacuum cleaner 100 by the main wheel 111*a*. The sub wheel 111*b* may also be provided in the suction unit 120 which will be described later.

As described above, the control unit is configured to control the driving of the wheel unit 111 in such a manner that the robot vacuum cleaner 100 autonomously drives on the floor.

Meanwhile, a battery (not shown) for supplying power to the robot vacuum cleaner 100 is mounted on the vacuum cleaner body 110. The battery may be configured to be rechargeable, and configured to be detachable from a bottom portion of the vacuum cleaner body 110.

The suction unit 120 is disposed to protrude from one side of the vacuum cleaner body 110 to suck air containing dust. The one side may be a side on which the vacuum cleaner body 110 drives in a forward direction (F), that is, a front side of the vacuum cleaner body 110.

In the present drawing, it is shown that the suction unit 120 is protruded from one side of the vacuum cleaner body 110 to a front side and both left and right sides thereof. A front end portion of the suction unit 120 is disposed at a position spaced forward from one side of the vacuum cleaner body 110 and both left and right end portions of the suction unit 120 are disposed at positions spaced apart from one side of the vacuum cleaner body 110 to both left and right sides thereof.

As the vacuum cleaner body 110 is formed in a circular shape, and both ends of a rear end portion of the suction unit 120 are formed to protrude from the vacuum cleaner body 110 to both left and right sides thereof, a vacant space, namely, a gap, may be formed between the vacuum cleaner body 110 and the suction unit 120. The vacant space is a space between both left and right end portions of the vacuum cleaner body 110 and both left and right end portions of the suction unit 120, and has a shape recessed in an inward direction of the robot vacuum cleaner 100.

When an obstacle is caught in the vacant space, the robot vacuum cleaner 100 may be blocked by an obstacle not to move. In order to prevent this, a cover member 129 may be disposed to cover at least part of the vacant space. The cover member 129 may be provided in the vacuum cleaner body 110 or the suction unit 120. According to the present embodiment, it is shown that the cover member 129 is formed in a protruding manner on both sides of a rear end portion of the suction unit 120, and disposed to cover an outer peripheral surface of the vacuum cleaner body 110.

The cover member 129 is disposed to fill at least part of the vacant space, that is, a vacant space between the vacuum cleaner body 110 and the suction unit 120. Therefore, it may be possible to implement a structure capable of preventing an obstacle from being caught in the vacant space, or being easily released from the obstacle even when the obstacle is caught in the vacant space.

The cover member 129 formed to protrude from the suction unit 120 may be supported on an outer circumferential surface of the vacuum cleaner body 110. If the cover member 129 is formed in a protruding manner from the vacuum cleaner body 110, then the cover member 129 may be supported on a rear portion of the suction unit 120. According to the above structure, when the suction unit 120 collides with an obstacle to receive an impact, part of the impact may be transmitted to the vacuum cleaner body 110 to disperse the impact.

The suction unit 120 may be detachably coupled to the vacuum cleaner body 110. When the suction unit 120 is separated from the vacuum cleaner body 110, a mop module (not shown) may be detachably coupled to the vacuum cleaner body 110 in place of the separated suction unit 120. Accordingly, the suction unit 120 may be mounted on the vacuum cleaner body 110 when the user wants to remove dust on the floor, and a mop module may be mounted on the vacuum cleaner body 110 when the user wants to mop the floor.

When the suction unit 120 is mounted on the vacuum cleaner body 110, the mounting may be guided by the cover member 129 described above. In other words, the cover member 129 may be disposed to cover an outer circumferential surface of the vacuum cleaner body 110, thereby determining a relative position of the suction unit 120 with respect to the vacuum cleaner body 110.

A sensing unit 130 is disposed in the vacuum cleaner body 110. The sensing unit 130 may be disposed at one side of the vacuum cleaner body 110 where the suction unit 120 is located, that is, in front of the vacuum cleaner body 110.

The sensing unit 130 may be disposed to overlap with the suction unit 120 in a vertical direction of the vacuum cleaner body 110. The sensing unit 130 is disposed at an upper portion of the suction unit 120 to sense an obstacle or geographic feature in front of the suction unit 120 so that the suction unit 120 positioned at the forefront of the robot vacuum cleaner 100 does not collide with the obstacle.

The sensing unit 130 is configured to additionally perform another sensing function in addition to the sensing function. It will be described in detail later.

The vacuum cleaner body 110 is provided with a dust bin accommodation portion 113, and the dust bin 140 for separating dust from the air sucked to collect the dust is detachably coupled to the dust bin accommodation portion 113. As illustrated in the drawing, the dust box accommodation portion 113 may be formed on the other side of the vacuum cleaner body 110, namely, behind the vacuum cleaner body 110.

A part of the dust box 140 is accommodated in the dust box accommodation portion 113 and another part of the dust box 140 is formed to protrude toward a rear side of the vacuum cleaner body 110 (i.e., a reverse direction (R) opposite to a forward direction (F)).

The dust box 140 is formed with an inlet 140*a* through which air containing dust is introduced and an outlet 140*b* through which air separated from dust is discharged, and when the dust box 140 is installed in the dust box accommodation portion 113, the inlet 140*a* and the outlet 140*b* are configured to communicate with a first opening 110*a* and a second opening 110*b* formed in an inner wall of the dust box accommodation portion 113, respectively.

The intake passage in the vacuum cleaner body 110 corresponds to a passage from the inlet port (not shown) communicating with the communicating portion 120*b* to the first opening 110*a*, and the discharge passage corresponds to a passage from the second opening 110*b* to the discharge port 112.

According to such a connection relation, air containing dust introduced through the suction unit 120 is introduced into the dust box 140 through an intake air passage in the vacuum cleaner body 110, and air and dust are separated from each other as they pass through a filter or cyclone of the dust box 140. Dust is collected in the dust box 140, and air is discharged from the dust box 140 and then discharged to the outside through the discharge port 112 in the vacuum cleaner body 110 and finally through the discharge port 112.

An embodiment related to the components of the robot vacuum cleaner 100 will be described below with reference to FIG. 4.

The robot vacuum cleaner 100 or mobile robot according to an embodiment of the present disclosure may include at least one of a communication unit 1100, an input unit 1200, a driving unit 1300, a sensing unit 1400, an output unit 1500, a power supply unit 1600, a memory 1700 and a control unit 1800, or a combination thereof.

Figure 4:
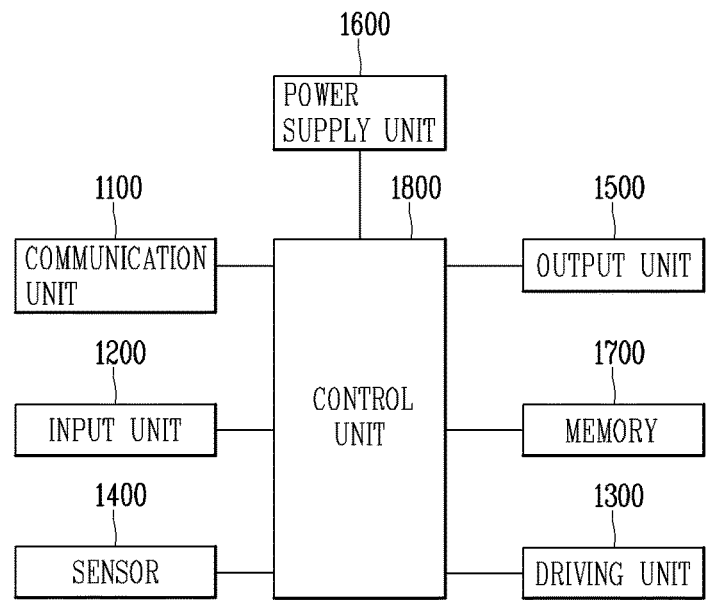
FIG. 4 is a block diagram illustrating the components of a vacuum cleaner that performs autonomous driving according to an embodiment of the present disclosure.

Here, it is needless to say that the components shown in FIG. 4 are not essential, and thus a robot vacuum cleaner having more or fewer components than shown in FIG. 4 may be implemented. Hereinafter, each component will be described.

First, the power supply unit 1600 includes a battery that can be charged by an external commercial power supply, and supplies power to the mobile robot. The power supply unit 1600 supplies driving power to each of the components included in the mobile robot to supply operating power required for the mobile robot to drive or perform a specific function.

Here, the control unit 1800 may sense the remaining power of the battery, and control the battery to move power to a charging base connected to the external commercial power source when the remaining power is insufficient, and thus a charge current may be supplied from the charging base to charge the battery. The battery may be connected to a battery sensing unit, and a battery remaining amount and a charging state may be delivered to the control unit 1800. The output unit 1500 may display the battery remaining amount on the screen by the control unit.

The battery may be located in a lower portion of the center of the robot vacuum cleaner or may be located at either one of the left and right sides. In the latter case, the mobile robot may further include a balance weight for eliminating a weight bias of the battery.

On the other hand, the driving unit 1300 may be provided with a motor to drive the motor, thereby rotating the left and right main wheels in both directions to rotate or move the main body. The driving unit 1300 may allow the main body of the mobile robot to move forward, backward, leftward and rightward, drive in a curved manner or rotate in place.

Meanwhile, the input unit 1200 receives various control commands for the robot vacuum cleaner from the user. The input unit 1200 may include one or more buttons, for example, the input unit 1200 may include an OK button, a set button, and the like. The OK button is a button for receiving a command for confirming sensing information, obstacle information, position information, and map information from the user, and the set button is a button for receiving a command for setting the information from the user.

In addition, the input unit 1200 may include an input reset button for canceling a previous user input and receiving a user input again, a delete button for deleting a preset user input, a button for setting or changing an operation mode, a button for receiving a command to be restored to the charging base, and the like.

Furthermore, the input unit 1200, such as a hard key, a soft key, a touch pad, or the like, may be installed on an upper portion of the mobile robot. In addition, the input unit 1200 may have a form of a touch screen along with the output unit 1500.

On the other hand, the output unit 1500 may be installed on an upper portion of the mobile robot. Of course, the installation position and installation type may vary. For example, the output unit 1500 may display a battery level state, a driving mode or manner, or the like on a screen.

In addition, the output unit 1500 may output state information inside the mobile robot detected by the sensing unit 1400, for example, a current state of each configuration included in the mobile robot. Moreover, the output unit 1500 may display external state information, obstacle information, position information, map information, and the like detected by the sensing unit 1400 on the screen. The output unit 1500 may be formed with any one of a light emitting diode (LED), a liquid crystal display (LCD), a plasma display panel, and an organic light emitting diode (OLED).

The output unit 1500 may further include a sound output device for audibly outputting an operation process or an operation result of the mobile robot performed by the control unit 1800. For example, the output unit 1500 may output a warning sound to the outside in accordance with a warning signal generated by the control unit 1800.

Here, the sound output device may be a device for outputting sound such as a beeper, a speaker, or the like, and the output unit 1500 may output the sound to the outside through the sound output device using audio data or message data having a predetermined pattern stored in the memory 1700.

Accordingly, the mobile robot according to an embodiment of the present disclosure may output environment information on a driving area on the screen or output it as sound. According to another embodiment, the mobile robot may transmit map information or environment information to a terminal device through the communication unit 1100 to output a screen or sound to be output through the output unit 1500.

On the other hand, the communication unit 1100 is connected to the terminal device and/or another device (mixed with term "home appliance" in this specification) located in a specific area in one of wired, wireless, satellite communication methods to transmit and receive signals and data.

The communication unit 1100 may transmit and receive data with another located in a specific area. Here, the another device may be any device capable of connecting to a network to transmit and receive data, and for example, the device may be an air conditioner, a heating device, an air purification device, a lamp, a TV, an automobile, or the like. The another device may also be a device for controlling a door, a window, a water supply valve, a gas valve, or the like. The another device may also be a sensor for detecting temperature, humidity, air pressure, gas, or the like.

On the other hand, the memory 1700 stores a control program for controlling or driving the robot vacuum cleaner and the resultant data. The memory 1700 may store audio information, image information, obstacle information, position information, map information, and the like. Also, the memory 1700 may store information related to a driving pattern.

The memory 1700 mainly uses a nonvolatile memory. Here, the non-volatile memory (NVM, NVRAM) is a storage device that can continuously store information even when power is not supplied. Examples of the storage device include a ROM, a flash memory, a magnetic computer storage device (e.g., a hard disk, a diskette drive, a magnetic tape), an optical disk drive, a magnetic RAM, a PRAM, and the like.

Meanwhile, the sensing unit 1400 may include at least one of an impact sensor, an external signal detection sensor, a front detection sensor, a cliff detection sensor, a lower camera sensor, an upper camera sensor and a three-dimensional camera sensor.

The impact sensor may be provided at at least one point on an outer surface of the main body, and may sense a physical force applied to the point.

In one example, the impact sensor may be disposed on the outer surface of the main body to be directed toward the front of the main body. In another example, the impact sensor may be disposed on the outer surface of the body to be directed to the rear of the body. In another example, the impact sensor may be disposed on the outer surface of the main body to be directed toward the left or right side of the main body.

The external signal detection sensor may sense an external signal of the mobile robot. The external signal detection sensor may be, for example, an infrared ray sensor, an ultrasonic sensor, a radio frequency (RF) sensor, or the like.

The mobile robot may detect a position and direction of the charging base by receiving a guidance signal generated by the charging base using the external signal sensor. At this time, the charging base may transmit a guidance signal indicating a direction and distance so that the mobile robot can return thereto. In other words, the mobile robot may receive a signal transmitted from the charging base to determine a current position, set a moving direction, and return to the charging base.

On the other hand, the front sensors or front detection sensors may be provided at regular intervals on a front side of the mobile robot, specifically, along a side outer circumferential surface of the mobile robot. The front sensor is located on at least one side surface of the mobile robot to detect an obstacle in front of the mobile robot. The front sensor may detect an object, especially an obstacle, present in a moving direction of the mobile robot and transmit detection information to the control unit 1800. In other words, the front sensor may detect protrusions on the moving path of the mobile robot, household appliances, furniture, walls, wall corners, and the like, and transmit the information to the control unit 1800.

For example, the frontal sensor may be an infrared ray (IR) sensor, an ultrasonic sensor, an RF sensor, a geomagnetic sensor, or the like, and the mobile robot may use one type of sensor as the front sensor or two or more types of sensors if necessary.

For an example, the ultrasonic sensors may be mainly used to sense a distant obstacle in general. The ultrasonic sensor may include a transmitter and a receiver, and the control unit 1800 may determine whether or not there exists an obstacle based on whether or not ultrasonic waves radiated through the transmitter is reflected by the obstacle or the like and received at the receiver, and calculate a distance to the obstacle using the ultrasonic emission time and ultrasonic reception time.

Furthermore, the control unit 1800 may compare ultrasonic waves emitted from the transmitter and ultrasonic waves received at the receiver to detect information related to a size of the obstacle. For example, the control unit 1800 may determine that the larger the obstacle is, the more ultrasonic waves are received at the receiver.

In one embodiment, a plurality of (for example, five) ultrasonic sensors may be provided along a lateral outer circumferential surface at a front side of the mobile robot. At this time, the ultrasonic sensors may preferably be installed on the front surface of the mobile robot in a manner that the transmitter and the receiver are alternately arranged.

In other words, the transmitters may be disposed at right and left sides with being spaced apart from a front center of the main body or one transmitter or at least two transmitters may be disposed between the receivers so as to form a reception area of an ultrasonic signal reflected from an obstacle or the like. With this arrangement, the reception area can increase while reducing the number of sensors. A radiation angle of ultrasonic waves may be maintained in a range of avoiding an affection to different signals so as to prevent a crosstalk. Furthermore, the receiving sensitivities of the receivers may be set to be different from each other.

In addition, the ultrasonic sensor may be installed upward by a predetermined angle so that the ultrasonic waves emitted from the ultrasonic sensor are output upward. In this instance, the ultrasonic sensor may further include a predetermined blocking member to prevent the ultrasonic waves from being radiated downward.

On the other hand, as described above, the front sensor may be implemented by using two or more types of sensors together, and thus the front sensor may use any one of an IR sensor, an ultrasonic sensor, an RF sensor and the like.

For an example, the front sensor may include an IR sensor as another sensor, in addition to the ultrasonic sensor.

The IR sensor may be installed on an outer circumferential surface of the mobile robot together with the ultrasonic sensor. The infrared sensor may also sense an obstacle existing at the front or the side to transmit obstacle information to the control unit 1800. In other words, the infrared sensor may sense a protrusion, a household appliance, a furniture, a wall surface, a wall corner, and the like, on the moving path of the mobile robot to transmit the information to the control unit 1800. Therefore, the mobile robot can move within a specific area without collision with an obstacle.

On the other hand, a cliff sensor (or cliff detection sensor) may detect an obstacle on the floor supporting the main body of the mobile robot by mainly using various types of optical sensors.

In other words, the cliff detection sensor may be installed on a rear surface of the bottom mobile robot, but may of course be installed in a different position depending on the type of the mobile robot. The cliff detection sensor is a sensor located on a back surface of the mobile robot to sense an obstacle on the floor, and the cliff detection sensor may be an infrared sensor, an ultrasonic sensor, an RF sensor, a PSD (Position Sensitive Detector) sensor, or the like, which is provided with a transmitter and a receiver such as the obstacle detection sensor.

For an example, any one of the cliff detection sensors may be installed in front of the mobile robot, and the other two cliff detection sensors may be installed relatively behind.

For example, the cliff detection sensor may be a PSD sensor, but may also be configured with a plurality of different kinds of sensors.

The PSD sensor detects a short and long distance position of incident light with one p-n junction using a semiconductor surface resistance. The PSD sensor includes a one-dimensional PSD sensor that detects light only in one axial direction, and a two-dimensional PSD sensor that detects a light position on a plane. Both of the PSD sensors may have a pin photodiode structure. As a type of infrared sensor, the PSD sensor uses infrared rays. The PSD sensor emits infrared ray, and measures a distance by calculating an angle of the infrared ray reflected and returned from an obstacle. In other words, the PSD sensor calculates a distance from the obstacle by using the triangulation method.

The PSD sensor includes a light emitter that emits infrared rays to an obstacle and a light receiver that receives infrared rays that are reflected and returned from the obstacle, and is configured typically as a module type. When an obstacle is detected by using the PSD sensor, a stable measurement value may be obtained irrespective of reflectivity and color difference of the obstacle.

The control unit 1800 may measure an infrared angle between an emission signal of infrared rays emitted from the cliff detection sensor toward the ground and a reflection signal reflected and received by the obstacle to sense a cliff and analyze the depth thereof.

On the other hand, the control unit 1800 may determine whether or not to pass according to the ground state of the sensed cliff using the cliff detection sensor, and determine whether or not to pass through the cliff according to the determination result. For example, the control unit 1800 determines whether or not a cliff is present and a depth of the cliff through the cliff detection sensor, and then passes through the cliff only when a reflection signal is sensed through the cliff detection sensor.

As another example, the control unit 1800 may also determine lifting of the mobile robot using the cliff sensor.

Meanwhile, the lower camera sensor is provided on a rear surface of the mobile robot to acquire image information on a lower surface, that is, a bottom surface (or a surface to be cleaned) during movement. The lower camera sensor is also referred to as an lower camera sensor. The lower camera sensor converts a downward image input from an image sensor provided in the sensor to generate image data in a predetermined format. The generated image data may be stored in the memory 1700.

Furthermore, one or more light sources may be installed adjacent to the image sensor. The one or more light sources irradiate light to a predetermined region of the bottom surface captured by the image sensor. In other words, when the mobile robot moves in a specific region along the bottom surface, a predetermined distance is maintained between the image sensor and the bottom surface when the bottom surface is flat. On the other hand, when the mobile robot moves on a bottom surface having a nonuniform surface, the robot moves away from the bottom surface by more than a predetermined distance due to the irregularities of the bottom surface and obstacles. At this time, the one or more light sources may be controlled by the control unit 1800 to adjust an amount of light to be irradiated. The light source may be a light emitting device capable of controlling the amount of light, for example, a light emitting diode (LED) or the like.

Using the lower camera sensor, the control unit 1800 may detect a position of the mobile robot irrespective of the slip of the mobile robot. The control unit 1800 may compare and analyze the image data captured by the lower camera sensor over time to calculate the moving distance and the moving direction, and calculate the position of the mobile robot on the basis of the moving distance and the moving direction. Using image information on a bottom side of the mobile robot using the lower camera sensor, the control unit 1800 may perform slip-resistant correction on the position of the mobile robot calculated by another device.

On the other hand, the upper camera sensor may be installed so as to face upward or forward of the mobile robot to photograph the surroundings of the mobile robot. When the mobile robot is provided with a plurality of upper camera sensors, the camera sensors may be disposed on a top or side surface of the mobile robot at a determined distance or angle.

The three-dimensional camera sensor may be attached to one side or a part of the main body of the mobile robot to generate three-dimensional coordinate information related to the surroundings of the main body.

In other words, the three-dimensional camera sensor may be a 3D depth camera that calculates a near and far distance of the mobile robot and an object to be captured.

Specifically, the three-dimensional camera sensor may capture a two-dimensional image related to the surroundings of the main body, and generate a plurality of three-dimensional coordinate information corresponding to the captured two-dimensional image.

In one embodiment, the three-dimensional camera sensor may include two or more cameras that acquire a conventional two-dimensional image, and may be formed in a stereo vision manner to combine two or more images obtained from the two or more cameras so as to generate three-dimensional coordinate information.

Specifically, the three-dimensional camera sensor according to the embodiment may include a first pattern irradiation unit for irradiating light with a first pattern in a downward direction toward the front of the main body, and a second pattern irradiation unit for irradiating the light with a second pattern in an upward direction toward the front of the main body, and an image acquisition unit for acquiring an image in front of the main body. As a result, the image acquisition unit may acquire an image of a region where light of the first pattern and light of the second pattern are incident.

In another embodiment, the three-dimensional camera sensor may include an infrared ray pattern emission unit for irradiating an infrared ray pattern together with a single camera, and capture the shape of the infrared ray pattern irradiated from the infrared ray pattern emission unit onto the object to be captured, thereby measuring a distance between the sensor and the object to be captured. Such a three-dimensional camera sensor may be an IR (infrared) type three-dimensional camera sensor.

In still another embodiment, the three-dimensional camera sensor may include a light emitting unit that emits light together with a single camera, receive a part of laser emitted from the light emitting unit reflected from the object to be captured, and analyze the received laser, thereby measuring a distance between the three-dimensional camera sensor and the object to be captured. The three-dimensional camera sensor may be a time-of-flight (TOF) type three-dimensional camera sensor.

Specifically, the laser of the above-described three-dimensional camera sensor is configured to irradiate a laser beam in the form of extending in at least one direction. In one example, the three-dimensional camera sensor may include first and second lasers, wherein the first laser irradiates a linear shaped laser intersecting each other, and the second laser irradiates a single linear shaped laser. According to this, the lowermost laser is used to sense obstacles in the bottom portion, the uppermost laser is used to sense obstacles in the upper portion, and the intermediate laser between the lowermost laser and the uppermost laser is used to sense obstacles in the middle portion.

In the following FIG. 5, an embodiment showing an installation aspect of a vacuum cleaner 100 and a charging station 510 in a cleaning area will be described.

Figure 5:
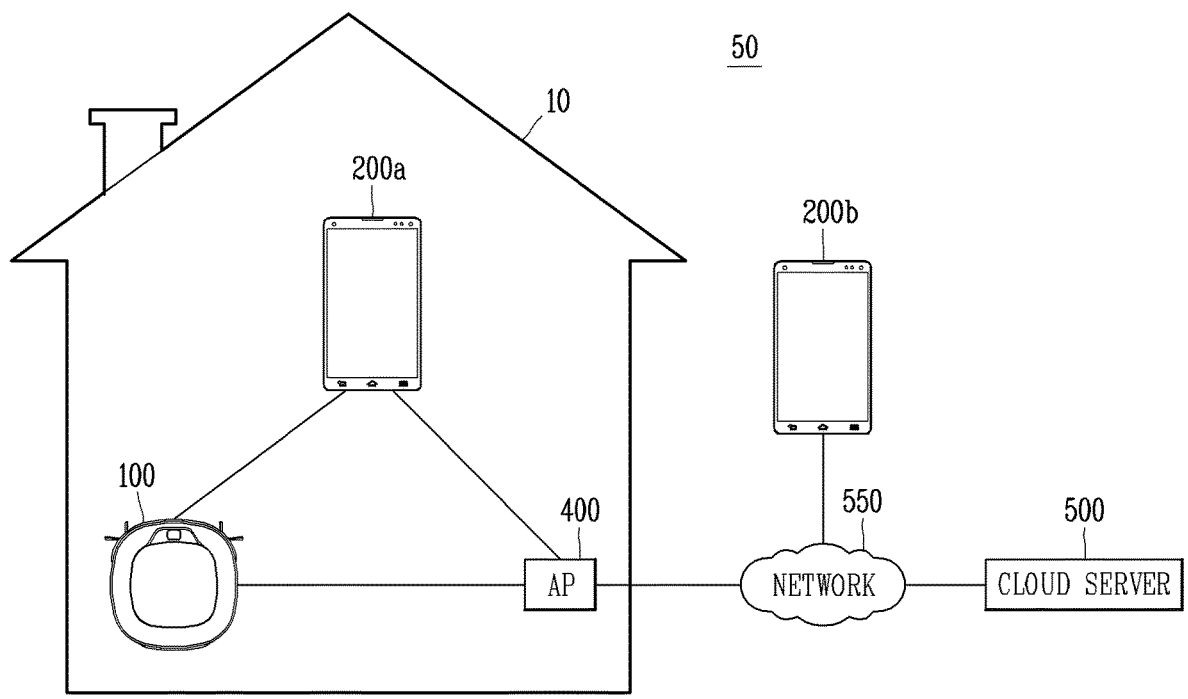
FIG. 5 is a conceptual view illustrating an example in which a vacuum cleaner and a charging station according to the present disclosure are installed in a cleaning area.

As shown in FIG. 5, the charging station 510 for charging a battery of the vacuum cleaner 100 may be installed in a cleaning area 500. In one embodiment, the charging station 510 may be installed at an outer edge of the cleaning area 500.

Although not shown in FIG. 5, the charging station 510 may include a communication device (not shown) capable of emitting different types of signals, and the communication device may perform wireless communication with the communication unit 1100 of the vacuum cleaner 100.

The control unit 1800 may control the driving unit 1300 such that the main body of the vacuum cleaner 100 is docked to the charging station 510 based on a signal received at the communication unit 1100 from the charging station 510.

The control unit 1800 may move the main body in a direction of the charging station 510 when a remaining capacity of the battery falls below a limit capacity, and control the driving unit 1300 to start a docking function when the main body is close to the charging station 510.

Hereinafter, referring to FIG. 6, a driving method of the vacuum cleaner 100 proposed in the present disclosure will be described.

In general, the vacuum cleaner 100 performing autonomous driving may move within a cleaning area according to a preset driving pattern 600. The vacuum cleaner 100 performing autonomous driving drives in various patterns to minimize a dead zone in which cleaning is not performed within the cleaning area.

Figure 6:
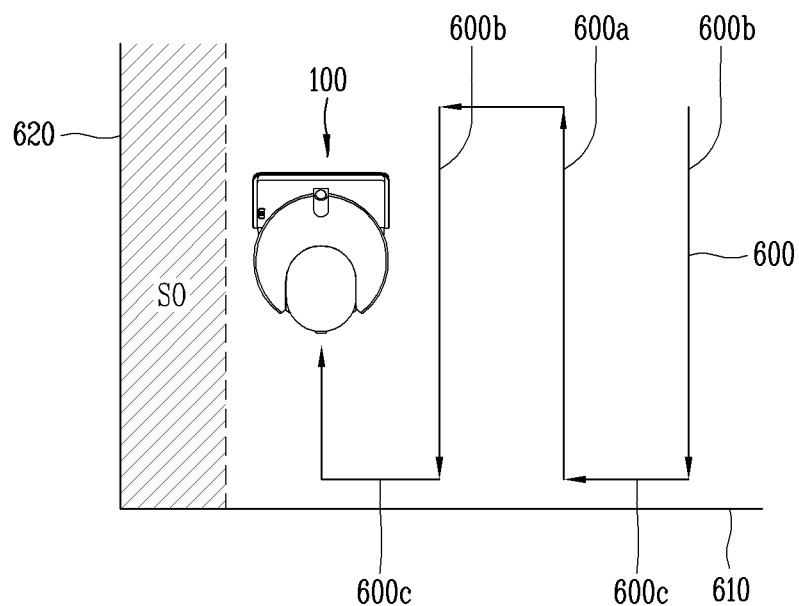
FIGS. 6 to 12 are conceptual views illustrating a driving method of a vacuum cleaner that performs autonomous driving according to the present disclosure.

The driving pattern 600 shown in FIG. 6, as a zigzag pattern, in a direction perpendicular to one surface of a first wall 610 of the cleaning area, is a repetitive combination of a first pattern 600a moving away from the wall, and second pattern 600b moving closer toward the wall.

The zigzag pattern 600 includes a third pattern 600*c* between the first pattern and the second pattern in a direction parallel to one surface of the first wall 610 in order to change the driving direction.

On the other hand, since the suction unit 120 of the vacuum cleaner 100 proposed in the present disclosure is provided on a front side of the main body, when moving along the third pattern 600*c* of FIG. 6, there may be a problem that the cleaning ability for a corner area is deteriorated.

In particular, when the vacuum cleaner 100 in zigzag driving approaches the second wall 620 defining a corner of the cleaning area together with the first wall 610, it no longer approaches the second wall 620, and thus an uncleaned area (S0) including a corner formed by the first and second walls is generated.

In the following description, a control method of the vacuum cleaner 100 for solving the problem is proposed.

Figure 7:
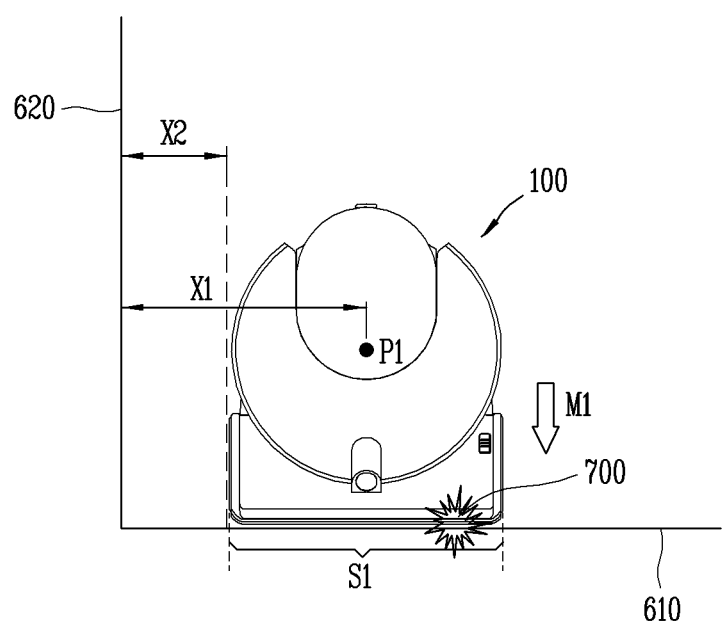

First, referring to FIG. 7, while driving according to a preset driving pattern 600, the control unit 1800 may sense whether there is a contact 700 between one surface of the main body and a first point of the first wall 610 existing in a driving direction of the main body.

Specifically, while performing first driving (M1) in a direction approaching the first wall 610 according to a zigzag pattern, the control unit 1800 may determine whether the wall 610 is in contact with the main body using a sensing result of the impact sensor disposed at a front surface of the body.

In other words, when the output of the impact sensor exceeds a reference output, the control unit 1800 may determine that a front surface of the body has come into contact with an obstacle or a wall.

In one embodiment, the control unit 1800 may determine that the point provided with the impact sensor has collided with an obstacle or a wall, using information related to the installation position of the impact sensor.

Hereinafter, when the front surface of the main body is in contact with the first wall 610, the center position of the vacuum cleaner 100 is defined as a first position (P1).

Moreover, the control unit 1800 may detect a distance between a side surface of the main body and the second wall 620 using a sensor provided at the side surface of the main body.

In this case, the sensor provided on the side surface of the main body may be composed of various types of sensors such as an ultrasonic sensor, an infrared sensor, a camera sensor, and a laser sensor capable of sensing a distance between the obstacle and the main body.

When a front surface of the main body is in contact with the first wall 610, the control unit 1800 may detect a distance (X1) between the first position (P1) of the vacuum cleaner 100 and the second wall 620 using a sensor provided on the side surface of the main body. In addition, the control unit 1800 may determine whether the vacuum cleaner 100 has entered a corner area in the cleaning area based on the detected distance (X1).

Moreover, when the front surface of the main body is in contact with the first wall 610, the control unit 1800 may detect a distance (X2) between the side surface of the main body and the second wall 620 using a sensor provided on the side surface of the main body. Besides, the control unit 1800 may determine whether the vacuum cleaner 100 has entered a corner area in the cleaning area based on the detected distance (X2).

As shown in FIG. 7, when the front surface of the main body is in contact with the first wall 610, cleaning is performed on a first portion (S1) of the first wall 610. Specifically, the first portion (S1) may correspond to a portion in which the suction unit 120 of the vacuum cleaner 100 is in contact with the first wall 610.

However, after the vacuum cleaner 100 reaches the first position (P1), there is a problem that cleaning cannot be performed on an area (S0) existing between the second wall 620 and the first position (P1) with only a general zigzag driving algorithm.

Therefore, Until the front surface of the main body contacts the second wall 620, the control unit 1800 may control the driving unit 1300 using a corner driving method to allow the side surfaces of the main body are brought into contact with or spaced apart from the first wall 610 at least once or more.

First, in FIGS. 8 to 10, a posture change driving method for performing the foregoing corner driving will be described.

Figure 8:
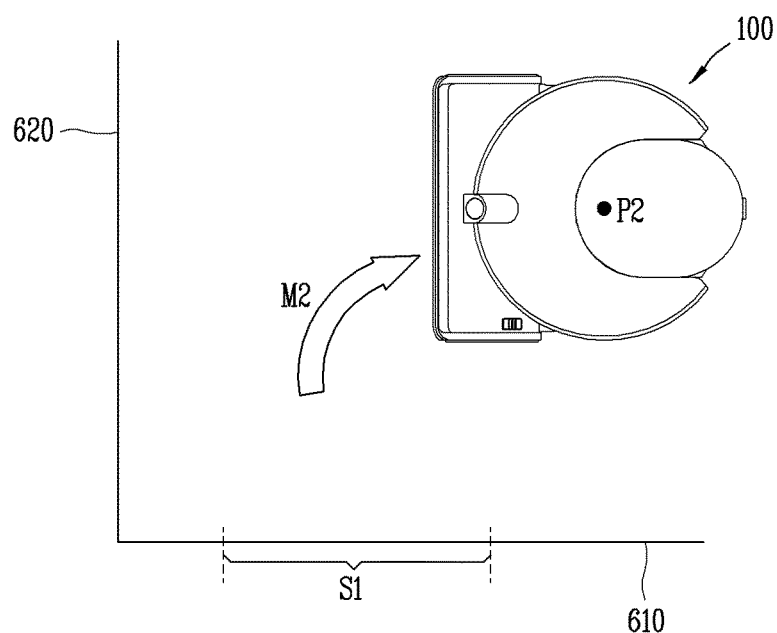
Figure 9:
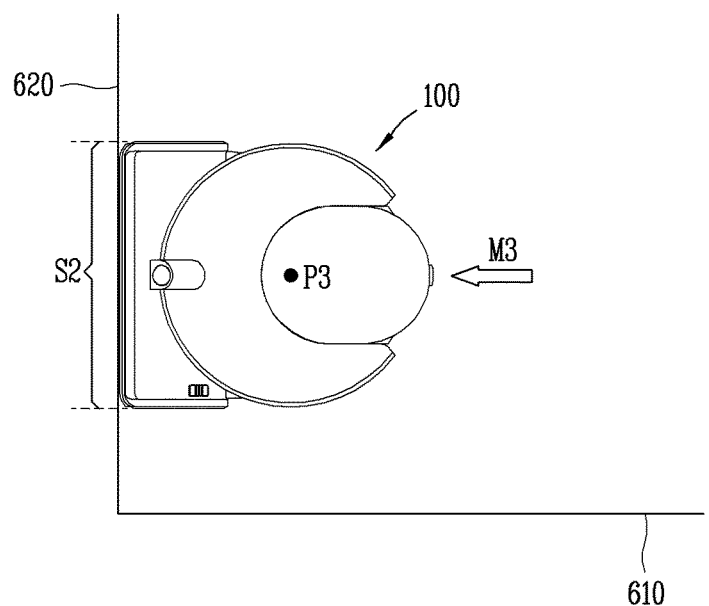
Figure 10:
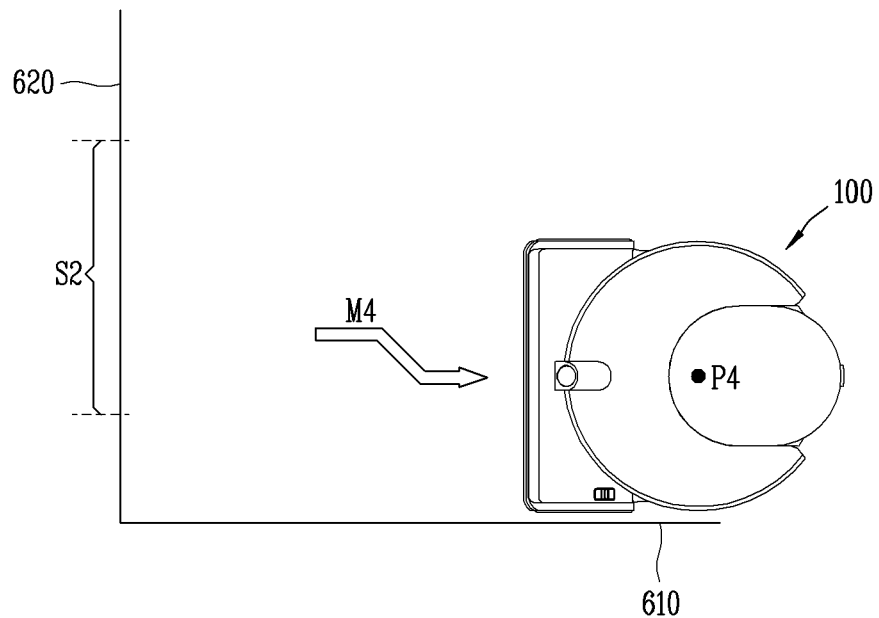

As shown in FIGS. 8 to 10, when a front surface of the main body is in contact with the first wall 610. the control unit 1800 may control the driving unit 1300 using a posture change driving method that changes the posture of the main body to allow the front surface of the main body to face the second wall 620

Referring to FIG. 8, when the front surface of the main body is in contact with the first wall 610, the control unit 1800 may perform a first posture change process (M2) of moving the main body backward.

A reverse path corresponding to the first posture change process (M2) may be a curved path as shown in FIG. 8. At this time, the control unit 1800 may control the driving unit 1300 to allow the front surface of the main body faces the second wall 620 while moving the main body backward.

For reference, the position of the vacuum cleaner 100 at a time point when the first posture change process (M2) is completed is defined as a second position (P2).

Then, the control unit 1800 may perform second posture change driving (M3) allowing the vacuum cleaner 100 to go straight until the front surface of the main body comes into contact with the second wall 620.

Referring to FIG. 9, cleaning on a portion (S2) of the second wall 620 is performed by the second posture change driving (M3).

Next, referring to FIG. 10, the control unit 1800 may perform third posture change driving (M4) to allow either one of the two side surfaces of the main body, which is close to the first wall 610, to come into contact with the first wall 610.

As shown in FIG. 10, the control unit 1800 may change the rotation direction of the main body while performing the third posture change driving (M4), thereby controlling the driving unit 1300 to allow the side surface of the main body to come into contact with the first wall 610.

Meanwhile, the posture change driving method illustrated in FIGS. 8 to 10 is only an example for explaining the present disclosure, and the present disclosure is not limited thereto.

In other words, when the vacuum cleaner 100 enters the first position (P1) within the corner area, the control unit 1800 according to the present disclosure may control the driving unit 1300 using various driving methods to allow the front surface of the vacuum cleaner 100 to face toward the second wall 620 while the side surface of the vacuum cleaner 100 is in contact with the first wall 610.

Figure 11:
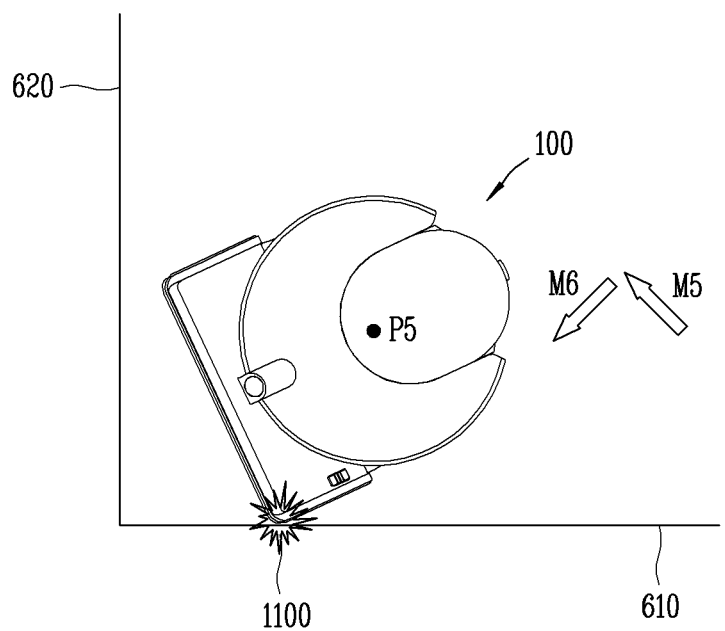

Referring to FIG. 11, when the main body of the vacuum cleaner 100 enters the corner area, the control unit 1800 may control the driving unit 1300 to allow a first side surface of the main body to come into contact with the first wall 610 at least once or more.

For reference, when the vacuum cleaner enters the first position (P1), the first side surface of the main body is defined as either one of both side surfaces of the main body, which is further spaced apart from the second wall 620. Accordingly, when the vacuum cleaner enters the first position (P1), the other one of both side surfaces of the main body, which is closer to the second wall 620, is defined as a second side surface.

An impact sensor (not shown) that senses a physical force applied from the outside may be provided on the first side surface. The impact sensor may be composed of various types of sensors, and any shape may be used as long as it is composed of a sensor capable of sensing external pressure. The detailed description of a structure or shape of a sensor that senses pressure applied from the outside will be omitted.

As shown in FIG. 11, when the posture change driving (M2, M3, M4) is completed, the control unit 1800 may perform first corner driving (M5) that separates the first side surface from the first wall 610, and second corner driving (M6) allowing the first side surface to be brought into contact with the first wall again.

In particular, the control unit 1800 may perform the first and second corner driving alternately and repeatedly until the front surface of the main body is brought into contact with the second wall 620.

In addition, in order to perform the first corner driving, the control unit 1800 may rotate either one of two main wheels disposed on both sides of the vacuum cleaner 100, which is closer to the first wall 610, more rapidly than the other one.

On the contrary, in order to perform the second corner driving, the control unit 1800 may rotate either one of two main wheels, which is closer to the first wall 610, more slowly than the other one.

Figure 12:
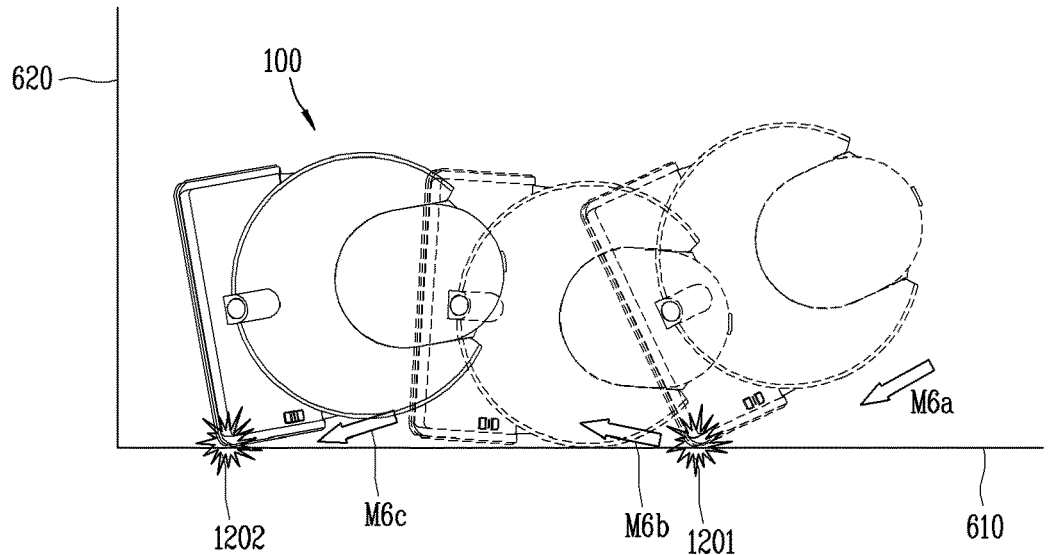

Referring to FIG. 12, the control unit 1800 may control the driving unit 1300 such that the front surface of the main body enters a corner formed between the first and second walls while allowing the first side of the main body to collide with the first wall 610 a plurality of times.

As shown in FIG. 12, the control unit 1800 may alternately perform first corner driving (M6b) at least once or more and second corner driving (M6a, M6c) at least once or more.

In one embodiment, the control unit 1800 may determine whether to perform the first corner driving or the second corner driving based on the output of a sensor provided on the first side surface.

Specifically, when the output of the sensor provided on the first side surface increases from a value below a preset first reference to a value above a preset second reference, the control unit 1800 may control the driving unit 1300 to perform the first corner driving. At this time, the second reference value is set to be greater than the first reference value.

On the contrary, when the output of the sensor provided on the first side surface decreases from a value above the second reference to a value below the first reference, the control unit 1800 may control the driving unit 1300 to perform the second corner driving.

An impact sensor (not shown) for sensing pressure applied from the outside may be provided on a front surface of the main body as well as the side surface of the main body, and the control unit 1800 may determine whether the front surface of the main body is in contact with the second wall 620 by first and second corner driving using the impact sensor on the front surface of the main body.

Figure 13:
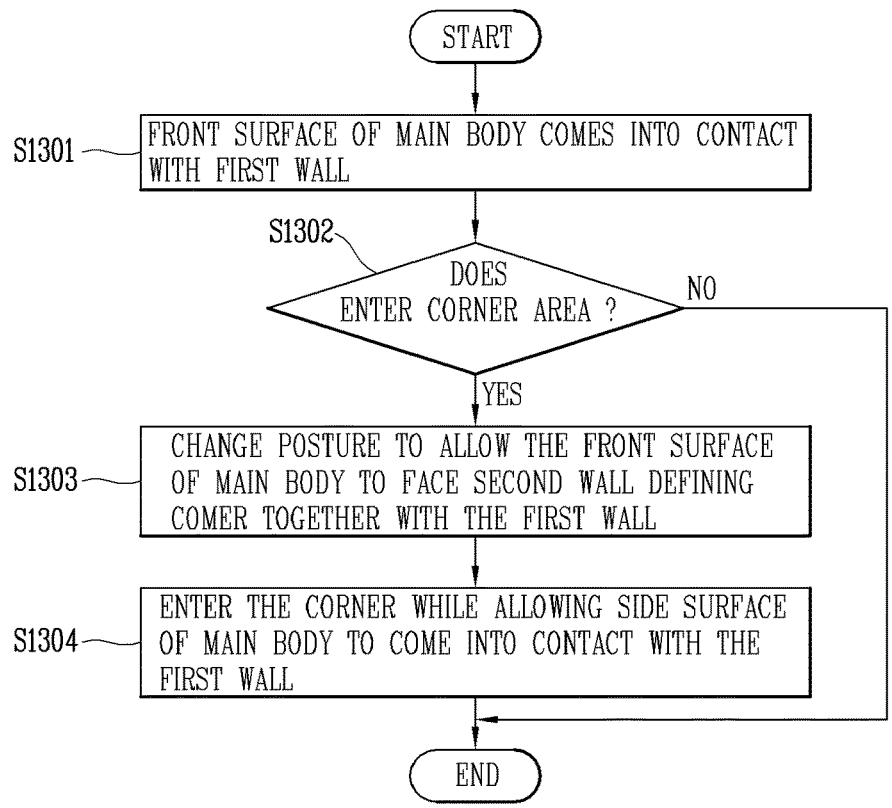
FIG. 13 is a flowchart illustrating a control method of a vacuum cleaner that performs autonomous driving according to the present disclosure.

In FIG. 13, a method of controlling the foregoing vacuum cleaner 100 will be described.

First, the control unit 1800 may determine whether the front surface of the main body is in contact with the first wall 610 (S1301).

When the front surface of the main body is in contact with the first wall 610, the control unit 1800 may sense a distance between the second wall 620 located on the side surface of the main body and the main body, and determine whether the main body enters the corner area based on the sensing result (S1302).

Then, the control unit 1800 may perform posture change driving to allow the front surface of the main body to face the second wall 620 (S1303).

When the posture change driving is completed, the control unit 1800 may perform corner driving that allows the front surface of the main body to enter a corner while allowing the side surface of the main body to come into contact with the first wall 610 a plurality of times (S1304).

As described above, when the first corner driving and the second corner driving are performed alternately and repeatedly, the front surface of the main body enters the corner while the first side surface of the main body is in contact with or close to the first wall 610.

As a result, according to the present disclosure, a robot vacuum cleaner may perform precise driving in a corner area to clean a cleaning area thoroughly, thereby improving the performance of the vacuum cleaner.

In particular, according to the present disclosure, an uncleaned area in which cleaning cannot be performed by zigzag driving may be minimized, thereby improving user's satisfaction with the vacuum cleaner.

What is claimed is:

1. A vacuum cleaner performing autonomous driving, the vacuum cleaner comprising:
    a main body;
    a driving unit that moves the main body in a cleaning area;
    a suction unit provided on a front surface of the main body;
    a plurality of sensors provided on the front surface of the main body and on both side surfaces of the main body, respectively, to sense an obstacle present in each direction; and
    a control unit that controls the driving unit to move the main body based on a preset driving pattern,
    wherein the control unit detects whether to enter a corner area of the cleaning area using a first sensor provided on the front surface of the main body and a second sensor provided on a first side surface between the both side surfaces of the main body while driving according to the preset driving pattern, and controls the driving unit to allow the first side surface of the main body to come into contact with a first wall defining the corner area at least once or more when the main body enters the corner area,
    wherein the control unit selects a wall facing the front surface of the body as the first wall when entering the corner area between two walls defining the corner area,
    wherein when the first side surface comes into contact with the first wall, the control unit controls the driving unit to sequentially perform first corner driving to separate the first side surface from the first wall, and second corner driving to allow the first side surface to come into contact with the first wall again, wherein when the front surface of the main body comes into contact with the first wall, the control unit performs posture change driving that changes the posture of the main body to allow the front surface of the main body to face a second wall defining the corner area together with the first wall, and wherein the posture change driving comprises:
- a first posture change process of moving the main body backward along a first curved path to allow the front surface of the main body to face the second wall when the front surface of the main body comes into contact with the first wall,
- a second posture change process of moving the main body straight to allow the front surface of the main body to come into contact with the second wall, and
- a third posture change process to allow the main body to drive along a second curved path so that the side surface of the main body comes into contact with the first wall.

2. The vacuum cleaner of claim 1, wherein the second sensor provided on the first side surface is composed of an impact sensor that senses a physical force applied from the outside, and the control unit determines whether to perform the first corner driving or the second corner driving based on the output of the second sensor provided on the first side surface.

3. The vacuum cleaner of claim 2, wherein when the output of the second sensor provided on the first side surface increases from a value below a preset first reference to a value above a preset second reference, the control unit controls the driving unit to perform the first corner driving.

4. The method of claim 3, wherein when the output of the second sensor provided on the first side surface decreases from a value above the second reference to a value below the first reference, the control unit controls the driving unit to perform the second corner driving.

5. The vacuum cleaner of claim 1, wherein the control unit controls the driving unit to repeatedly perform the first and second corner driving until the suction unit provided on the front surface of the main body comes into contact with a second wall defining the corner area together with the first wall.

6. The vacuum cleaner of claim 5, wherein the first sensor provided on the front surface of the main body is composed of an impact sensor that senses a physical force applied from the outside, and the control unit determines whether the suction unit comes into contact with the second wall using the output of the first sensor provided on the front surface of the main body.

7. The vacuum cleaner of claim 1, wherein when the posture change driving is completed, the control unit controls the driving unit to repeatedly perform the first and second corner driving.

8. The vacuum cleaner of claim 1, wherein the driving unit comprises two main wheels corresponding to both side surfaces of the main body, respectively, and the control unit controls the driving unit to rotate either one of the two main wheels, which is closer to the first wall, more rapidly than the other one so as to perform the first corner driving.

9. The vacuum cleaner of claim 8, wherein the control unit controls the driving unit to rotate either one of the two main wheels, which is closer to the first wall, more slowly than the other one so as to perform the second corner driving.

10. The vacuum cleaner of claim 1, wherein the sensor provided on the both side surface of the main body is configured to sense a distance to an obstacle, and when the front surface of the main body comes into contact with the first wall, the control unit computes a distance from the side surface of the main body to the second wall, and determines whether the main body has entered the corner area based on the computed distance.

\* \* \* \* \*